(12) United States Patent  
Duncan

(10) Patent No.: US 6,322,112 B1  
(45) Date of Patent: Nov. 27, 2001

(54) KNOT TYING METHODS AND APPARATUS

(76) Inventor: Franklin R. Duncan, E. 11205 4$^{th}$ Ave., Spokane, WA (US) 99206

( * ) Notice: Subject to any disclaimer, the term of this patent is extended or adjusted under 35 U.S.C. 154(b) by 0 days.

(21) Appl. No.: 09/661,541

(22) Filed: Sep. 14, 2000

(51) Int. Cl.$^7$ ................................................. B65H 69/04
(52) U.S. Cl. .............................. 289/1.5; 289/1.2; 289/17; 7/106; 43/4
(58) Field of Search ................................ 289/1.2, 1.5, 17, 289/18.1; 43/1, 4, 43.16; 7/106

(56) References Cited

U.S. PATENT DOCUMENTS

| | | | |
|---|---|---|---|
| 2,689,147 | * 9/1954 | Smalley | 289/17 |
| 2,697,624 | * 12/1954 | Thomas et al. | 289/17 |
| 2,773,713 | * 12/1956 | Smalley | 289/17 |
| 3,106,417 | 10/1963 | Clow | 289/17 |
| 3,752,516 | * 8/1973 | Mumma | 289/17 |
| 3,787,081 | * 1/1974 | Macy | 289/17 |
| 3,825,961 | * 7/1974 | Klein | 7/106 |
| 4,188,052 | * 2/1980 | Browning | 289/17 |
| 4,315,445 | * 2/1982 | Catron | 43/1 |
| 4,403,797 | * 9/1983 | Ragland, Jr. | 289/17 |
| 4,607,869 | * 8/1986 | Bersche | 289/17 |
| 4,864,762 | * 9/1989 | Cox | 43/1 |
| 5,197,217 | * 3/1993 | Browning | 43/4 |
| 5,480,406 | * 1/1996 | Nolan et al. | 289/1.5 |
| 5,685,037 | * 11/1997 | Fitzner et al. | 7/106 |
| 5,690,369 | * 11/1997 | Steck, III | 289/17 |
| 5,690,370 | * 11/1997 | Steck, III | 289/17 |

\* cited by examiner

Primary Examiner—John J. Calvert  
Assistant Examiner—Gary L. Welch  
(74) Attorney, Agent, or Firm—Reidlaw, L.L.C.; John S. Reid

(57) ABSTRACT

Methods and apparatus for tying knots, and in particular knots used in sport fishing. An apparatus in accordance with the present invention includes a holding member configured to allow a user to hold the apparatus, and a first arm defined by a longitudinal axis. The first arm has a free end and a junction end, and the junction end is attached to the holding member. The apparatus also has a second arm having a free end and a junction end. The junction end of the second arm is also attached to the holding member. The first arm free end and the second arm free end are positioned, or are configured to be positionable, in spaced apart relationship. Preferably, the arms are positioned in a splayed-apart position of between about 15 degrees and 160 degrees. The first arm defines a groove parallel to the longitudinal axis, the groove opening out of the free end of the first arm. The second arm free end defines a hook support configured to support a fishing hook. The first arm free end can further define a notch configured to engage a flexible line. The invention also includes a method of tying a knot from a flexible line to secure an object to the line. The method includes the step of forming a double strand of line which is wrapped around itself to form a plurality of wraps around the double strand of line, each wrap defining a loop through which the double strand of line passes. The tag end of the line is then passed through the loops towards the standing end of the line, and the standing end of the line is then pulled tight to secure the line to the object.

32 Claims, 10 Drawing Sheets

KNOT TYING METHODS AND APPARATUS

FIELD OF THE INVENTION

This invention pertains to apparatus for assisting in the tying of knots, and to knots which can be tied using the apparatus. The knots can be particularly used with a flexible line used in fishing.

BACKGROUND OF THE INVENTION

An age-old problem encountered by fishermen and -women the world over is how to easily tie a knot to secure a fish hook to a line. There are many known, effective knots for securing fish hooks to lines, but they all require a fairly high degree of dexterity and patience to tie. When fishing for small and medium sized fish, for example trout, the fishing line which is attached to the hook is typically small in diameter, and made of transparent nylon. For example, a common hook used in fly fishing is a number 16 hook, which is approximately 0.375 inches long. A common leader line (or "tippet") used for such a hook is number 3× leader, which has a diameter of approximately 0.008 inches. Given that most persons have thumbs and fingers which are 0.50 inches wide and more, it can be quite difficult to manipulate the line to properly form the knot, and even more difficult to see if the knot is being properly formed. As expected, an improperly formed knot can result in the hook becoming disengaged from the line.

Adding to the problem is the fact that the most effective knots are typically the most complex knots. The general problems of manipulating the line and seeing the knot are thus exacerbated when forming the knot involves several process steps. In addition, fishing line is typically manufactured from nylon, a strong but relatively stiff material. This stiffness makes it difficult to keep the tag end of the line in place while attempting to form the knot—that is, the knot wants to "untie" since the stiffness of the nylon line tends to straighten the line.

One prior art apparatus for assisting in the tying of knots is shown in U.S. Pat. No. 3,106,417. FIG. 1 depicts an isometric view of this prior art apparatus. FIG. 2 depicts a side elevation view of the apparatus of FIG. 1 being used by a user to tie a knot. With reference to FIGS. 1 and 2, the apparatus 10 includes a tapered portion 12 on which the knot is formed, and an opposed portion 14 for supporting the hook "H" while tying the knot. The knot is formed by passing the standing end of the line "L" (i.e., the end of the line connected to the source of the line, such as a reel or spool) through a "U" shaped passageway 16 formed in the tapered portion 12 of the apparatus. The hook "H" is secured to the opposed portion 14 of the apparatus, and the line is looped through an eye "E" in the hook "H" and directed back towards the tapered section 12. This provides a free end, or "tag end", "La" of the line, which is manipulated to form the knot. This is accomplished by wrapping the tag end "La" around the tapered portion 12 a number of times as depicted in FIG. 2, and then passing the tag end through the "U" shaped passageway 16 in a direction away from the hook "H". The wraps of the line are then slipped off of the tapered portion 12 of the apparatus and cinched down onto the eye "E" of the hook "H". The knot which is formed is known as an end-tie.

As is evident from FIG. 2, in order to wrap the tag end "La" of the line "L" around the tapered end 12 of the apparatus 10, the user must use a hand-over-hand type of motion to wrap the tag end around the standing end of the line. This requires grasping the tag end "La" of the line and making a wrap, releasing the tag end and grasping it again from the other side of the apparatus, making another wrap, and so on, all of which requires a relatively high degree of manipulation of the line while forming the knot. Further, as indicated previously, nylon line is relatively stiff and will thus tend to unwind from the tapered portion when released by the user while repositioning the hand. This can be avoided by holding the tag end in place with the index finger "I" of the other hand (the hand shown in FIG. 2) while repositioning the first hand, but further adds to the complexity of the knot tying process.

Another knot tying process often encountered by fishermen and -women is splicing or joining two fishing lines together. A common example is joining a leader line to a thicker main line. The problems discussed above with respect to an end knot apply equally to a slice. That is, effective splice knots are typically complex, and handling the two lines to produce the knot is difficult due to the small line diameters and the stiffness of the lines. The apparatus disclosed in U.S. Pat. No. 3,106,417, described above, can be used to tie a splice as well as an end knot. However, the splicing process still requires a hand-over-hand motion, and therefore involves a high degree of manipulation to produce the splice.

What is needed then is a way to simplify the process of tying a knot to attach a fishing hook to a line, or of splicing two lines together, and which results in a strong knot which will effectively secure the hook to the line or the two lines together.

SUMMARY OF THE INVENTION

The present invention includes methods and apparatus for tying knots, and in particular knots used in sport fishing, although the invention should not be considered as limited to the area of fishing.

One apparatus in accordance with the present invention is an apparatus for assisting in tying knots. The apparatus includes a holding member configured to allow a user to hold the apparatus, and a first arm defined by a longitudinal axis. The first arm has a free end and a junction end, and the junction end is attached to the holding member. The apparatus also has a second arm having a free end and a junction end. The junction end of the second arm is also attached to the holding member. The first arm free end and the second arm free end are positioned, or are configured to be positionable, in spaced apart relationship. Preferably, the arms are positioned in a splayed-apart position of between about 15 degrees and 160 degrees. In addition, the first arm defines a groove parallel to the longitudinal axis, the groove opening out of the free end of the first arm. The second arm free end defines a second arm notch configured to support a fishing hook. The first arm free end can further define a second notch configured to engage a flexible line.

Methods for using the apparatus of the present invention are also included in the present invention. One method of using apparatus of the present invention is to attach an object, such as a fishing hook, to a flexible line, such as a fishing line. The line is defined by a free end (or "tag end"), and a "standing end", which can be connected to a supply source of the line. The object defines an opening through which the flexible line can be passed. The tag end of the line is passed through the opening in the object, and the object is supported in the notch in the second arm. The tag end of the line is doubled back towards the standing end of the line to form a double strand of line which passes in the proximity of the first arm free end. The double strand of line is then doubled back on itself again, and is wrapped around the first arm to thereby secure the double strand of line to the first arm. Preferably, the double strand of line is wrapped around the first arm a plurality of times to create multiple wraps of the double stand of line around itself. The wraps progress along the first arm from the free end towards the junction end.

After the double strand of line has been wrapped around the first arm, as just described, the tag end is passed through the indentation in the first arm (and thus through the wraps of the line) in a general direction towards the standing end of the line. This completes the basic shape of the knot. The wraps of line are then pulled off of the free end of the first arm, leaving the knot in an untightened form. The natural resilience of the line is first allowed to "straighten" the knot, and then the knot is pulled tight to secure the object to the line by pulling on the tag end of the line while securely holding the object.

Accordingly, the invention includes a novel method of tying a knot from a flexible line to secure an object to the flexible line. The flexible line is defined by a tag end and a standing end, and the object defines an opening to receive the flexible line. The method includes the steps of passing the tag end of the line through the opening and directing the tag end of the line back to the standing end of the line. The tag end of the line is then held against the standing end of the line to form a double strand of line. The double strand of line is wrapped around itself to form a plurality of wraps around the double strand of line, each wrap defining a loop through which the double strand of line passes. The wraps progress along the line in the general direction of the opening in the object. The tag end of the line is then passed through the loops in a general direction away from the opening in the object. The standing end of the line is then pulled tight to secure the line to the object.

The invention further includes a method for splicing two lines together, which can be practiced using the apparatus of the present invention. Finally, the invention includes novel knots tied using the methods and apparatus of the present invention.

DETAILED DESCRIPTION OF THE INVENTION

The present invention includes an apparatus for assisting in the tying of knots, and is particularly useful for tying a knot to secure an object, such as a fishing hook, to a flexible line. The invention also includes a method of using the apparatus to tie knots, as well as a novel knot which can be tied using the apparatus. The apparatus can also be used to splice two line together. In general, the apparatus includes two arms or extensions each having a free end. The free ends are located in a spaced-apart relationship, and are preferably mounted at an angle to one another. The two arms can be attached directly to one another, or they can be supported by a holding member which acts as a handle for a user. One arm is configured to support a fishing hook, as for example by incorporating a notch near the free end. The other arm is provided with an indentation which allows a flexible line to be passed into the indentation and pass from the free end of the arm. This feature allows the line to be wrapped in coils around the arm, and the free end (or "tag end") of the line to passed through the coils in the process of forming a knot.

The apparatus will be more fully described below, as well as its methods of use. I will also describe a novel knot which can be used to secure an object, such as a fishing hook, to a flexible line. The knot can be tied using the apparatus of the present invention.

These and other methods and apparatus in accordance with the present invention will now be more fully described.

Figure 1:
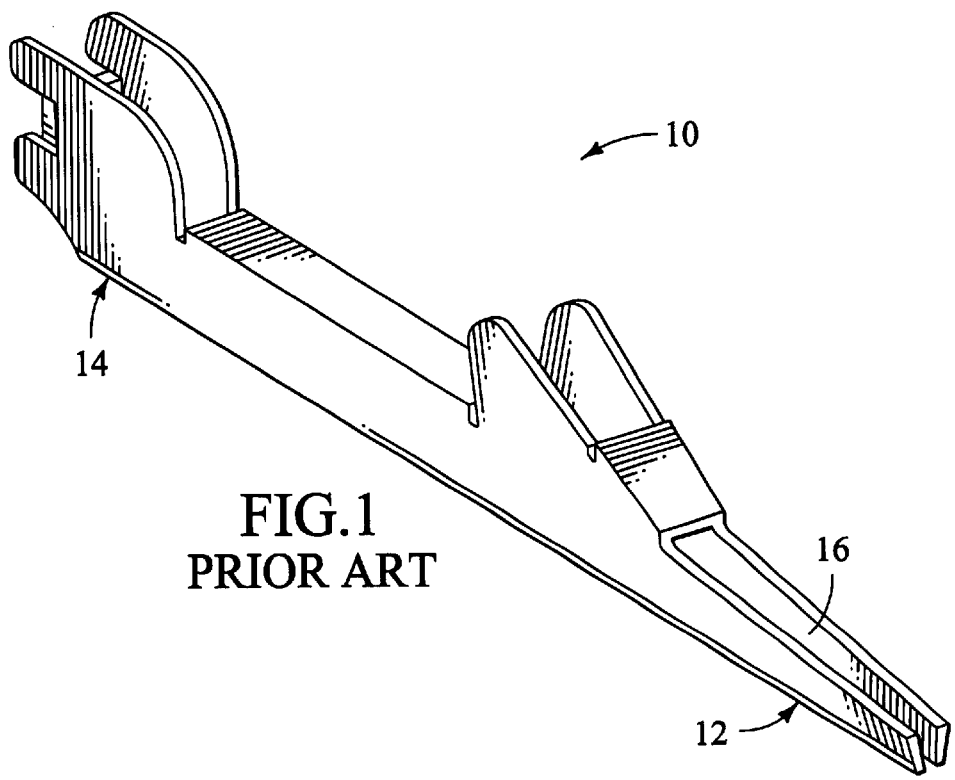
FIG. 1 is an isometric drawing of a knot tying device of the prior art.
Figure 2:
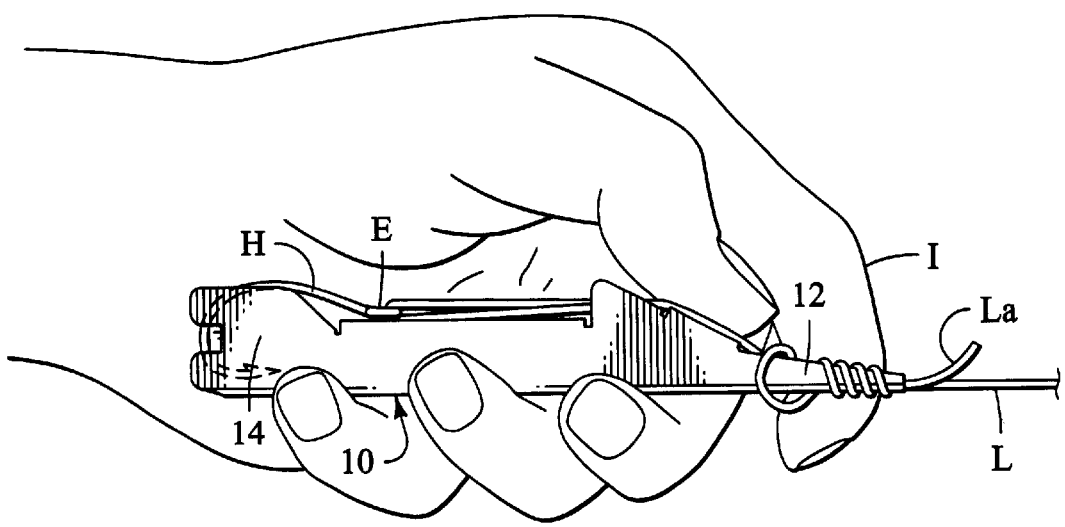
FIG. 2 a side elevation view depicting a prior art method of tying a knot using the prior art apparatus of FIG. 1.
Figure 3:
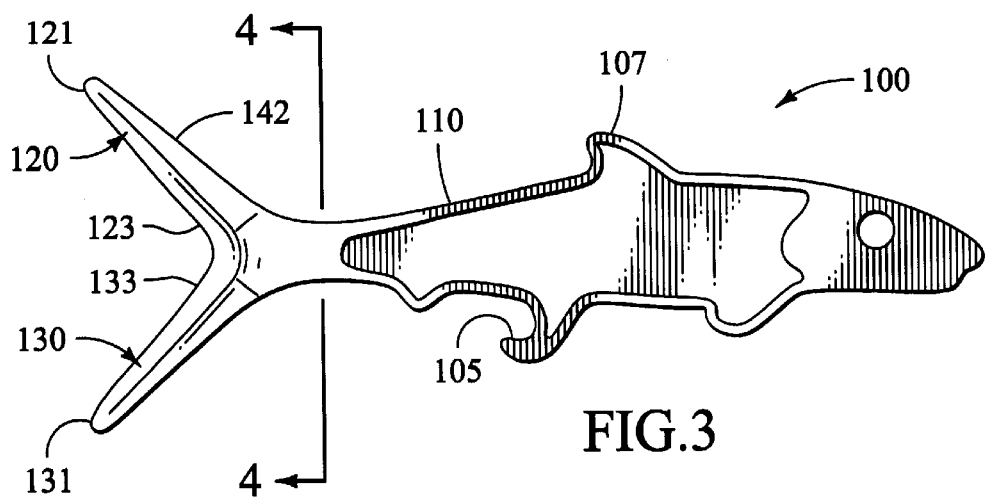
FIG. 3 is a side elevation view of one embodiment of an apparatus in accordance with the present invention.

Turning to FIG. 3, one embodiment in accordance with the present invention of an apparatus for assisting in tying knots is shown in side elevation view. The apparatus is configured in the shape of a fish, although other shapes can also be used to equal effect, as will be described below. The apparatus 100 comprises a holding member 110 which allows a user to hold the apparatus. In the embodiment shown, the holding member is fashioned in the shape of the body of a fish. Attached to the holding member 110 are a first arm 120 and a second arm 130. In the embodiment shown, the first and second arms are fashioned in the shape of respective upper and lower tail fins of a fish. The first arm is defined by a free end 121 and a junction end 123, which is attached to the holding member 110. In like manner, the second arm 130 is defined by a free end 131 and a junction end 133, which is attached to the holding member 110. Preferably, the first arm 120 is tapered to a reduced cross section from the junction end 123 to the tapered end 121.

Preferably the two arms 120 and 130 are mounted to the holding member 110 such that the respective free ends 121 and 131 are in a spaced-apart relationship, as shown. More preferably, the arms are attached to the holding member in a splayed-apart manner, having an angle of intersection of between about 10 degrees and 170 degrees, and more preferably between about 30 degrees and 110 degrees. In this manner a "V" shaped receptacle is formed by the two arms which can be useful in tying a knot using the apparatus, as will be explained further below.

The apparatus 100 can be further provided with useful accessories, such as a bottle opener 105 and a line cutting tool 107, both of which can be supported by the holding member 110.

Figure 4:
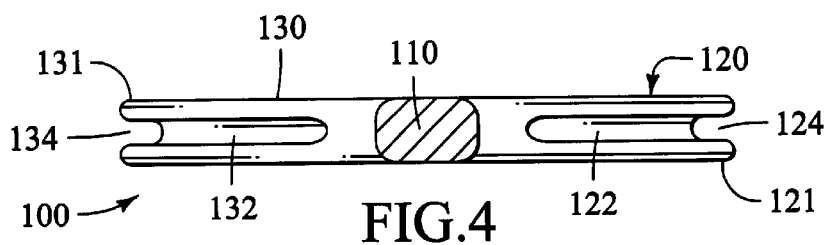
FIG. 4 is a side sectional view of the apparatus depicted in FIG. 3.

Turning now to FIG. 4, a side elevation cross sectional view of the apparatus 100 of FIG. 3 is depicted. As can be seen, the first arm 120 is provided with an indentation or groove 122 in the underside of the arm. This indentation 122 is sized to allow a flexible line to be received length-wise within the indentation and not protrude above the lower surface (142 of FIG. 3) of the first arm. The indentation is further configured to allow the line to pass freely from the free end 121 of the first arm 120. The significance of the features of the indentation 122 will be discussed further below. As depicted, the first arm is further provided with a notch 124 which facilitates passage of a flexible line from the free end 121 of the first arm. The second arm 130 is configured to support an object which is to be tied to a flexible line. In the example shown, the second arm 130 is provided with a notch 134 in the free end 131, configured to receive a fishing hook. The second arm 130 can also be provided with a groove 132 which can receive the point of a fishing hook to further secure the hook and to reduce the chance that a user will accidentally contact the hook point while tying a knot with the apparatus. Preferably, the first arm and the second arm are approximately equal in length.

Figure 5:
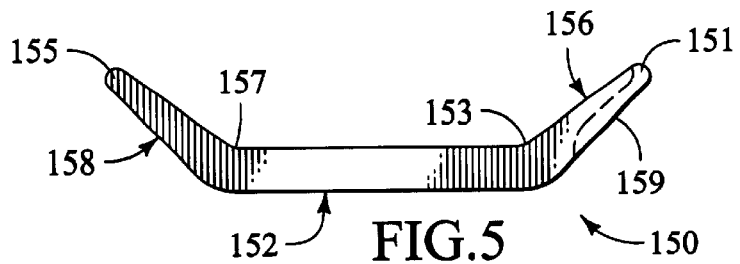
FIG. 5 is a side elevation view of a second embodiment of an apparatus in accordance with the present invention.

A second embodiment of an apparatus in accordance with the present invention is shown in side elevation view in FIG. 5. The apparatus 150 of FIG. 5 comprises a holding member 152, which here is an elongated member. The apparatus further comprises a first arm 156 which is defined by a free end 151 and a junction end 153. The junction end 153 is attached to one end of the holding member 152. A second arm 158, having a free end 155, is attached to the other end of the holding member 152 at a second arm junction end 157. The first arm 156 can be configured similar to the first arm 120 of the apparatus 100 shown in FIG. 4, particularly including a recessed portion 159 configured to receive a flexible line. The second arm 158 can be configured similar to the second arm 130 of the apparatus 100. As with the arms 120 and 130 of the apparatus 100, the arms 156 and 158 of the apparatus 150 are positioned such that the respective free ends 151 and 155 are in spaced-apart relationship. While arms 156 and 158 are depicted as being attached to the holding member 152 at an angle to one another, in fact they can also be perpendicular to the holding member such that the arms are parallel to one another. Preferably, the free ends 151 and 155 of the arms 156 and 158 are both located on the same side of the holding member 152.

Figure 6:
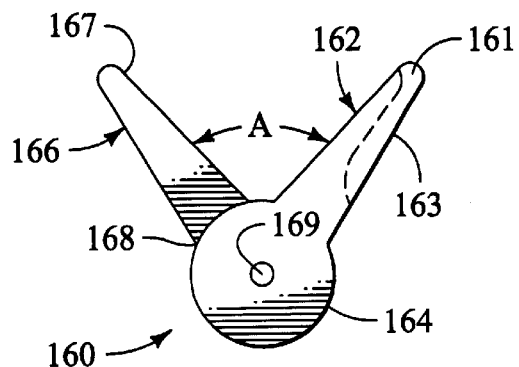
FIG. 6 is a side elevation view of a third embodiment of an apparatus in accordance with the present invention.

In FIG. 6 a third embodiment of an apparatus in accordance with the present invention is depicted in a side elevation view. In this embodiment the apparatus 160 comprises a first arm 162 and a second arm 166. The first arm is defined by a free end 161 and a junction end 164. In like manner, the second arm 166 is defined by a free end 167 and a junction end 168. The junction ends 164 and 168 are joined together by a hinge pin 169 allowing the two arms 162 and 166 to be moved together in the direction indicated by arrow "A". This allow the apparatus to be folded into a compact size when not in use. It should be noted in this embodiment that the apparatus does not include a separate holding member, as do the apparatus 100 of FIG. 3 and 150 of FIG. 5. Instead, the junction ends 164 and 168 act as the holding member. It should also be observed that either or both of the arms of the apparatus 100 and 150 of FIGS. 3 and 5 can be attached to the holding member in a hinged manner, allowing the arms to be folded for storage. Further, the arms of the apparatus 160 of FIG. 6 do not necessarily need to be attached in the hinged manner shown, but can be fixedly attached to one another.

As with the first arm of the embodiments previously discussed, the first arm 162 of the apparatus 160 of FIG. 6 is provided with a recess 163 configured to receive a length of flexible line, and allow the line to pass from the free end 161 of the first arm. Likewise, the second arm 166 is provided with a structure configured to support an object to which a line is to be tied. For example, the second arm 166 can define a notch in the free end 167, similar to the notch 134 of FIG. 4.

Figure 7:
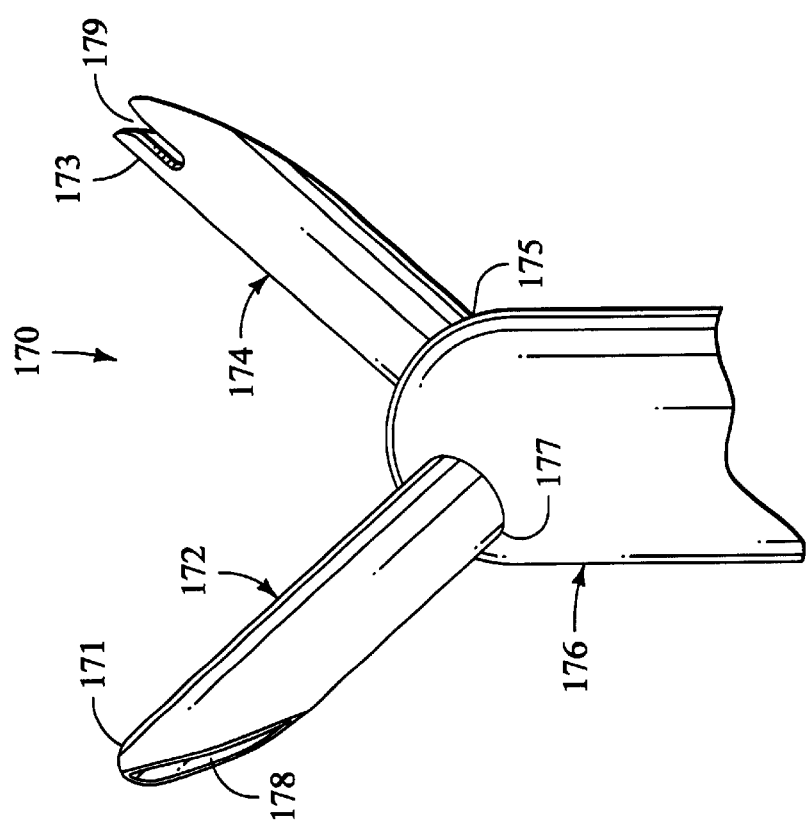
FIG. 7 is an isometric view of a fourth embodiment of an apparatus in accordance with the present invention.

Turning now to FIG. 7, a fourth embodiment of an apparatus in accordance with the present invention is depicted in an oblique view. The apparatus 170 comprises a holding member 176, a first arm 172, and a second arm 174. The first arm 172 is fabricated from a section of hollow tubing, and is defined by a free end 171 and a junction end 177. Likewise, the second arm 174 is fabricated from a section of hollow tubing, and is defined by a free end 173 and a junction end 175. The junction ends 177 and 175 are attached to the holding member 176 such that the free ends 171 and 173 of the arms are in spaced-apart relationship. One advantage of using a section of hollow tubing for the first arm 172 is that the arm can be tapered, and the indentation 178 for receiving the flexible line formed, by cutting the free end of the tubing section at a slant to the longitudinal axis of the tubing. Likewise, a notch 179 can be easily formed in the second arm 174 merely by notching the free end of the tubing section used for the second arm.

Figure 8:
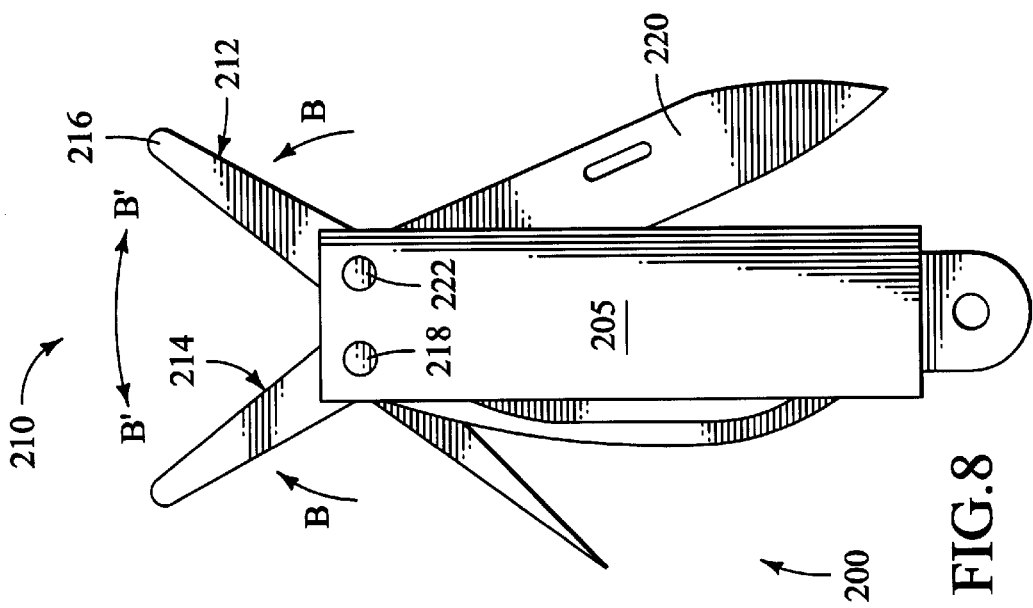
FIG. 8 is a side elevation view of a fifth embodiment of an apparatus in accordance with the present invention.

In FIG. 8 a fifth embodiment of an apparatus in accordance with the present invention is depicted in a side elevation view. The apparatus 200 comprises a pocket knife which comprises two folding arms, a first arm 212 and a second arm 214, which are configured to fold outward from the body 205 of the knife in the directions of arrows "B" and thereby form a knot tying device 210. First arm 212 is hingedly attached to the knife body 205 by first hinge 222, while the second arm 214 is hingedly attached to the knife body by hinge 218. When folded in the opposite direction, the two arms are received in pockets (not shown) in the side of the body 205 of the knife 200. The knife 200 can further comprise additional accessories, for example a knife blade 220, which are also configured to be received within pockets in the side of the knife body 205. Preferably, the arms 212 and 214 are provided with a locking mechanism (not shown) to hold them in the position shown when deployed from the body 205 of the knife. By releasing the lock mechanism, the two arm can be folded in the direction indicated by arrows "B'" and returned to the body of the knife for storage.

As with the previous embodiments described above, the first arm 212 of the knife 200 defines a receiving groove (not shown) configured to receive a length of flexible line, and allow the free end of the line to pass from the free end 216 of the first arm. Likewise, the second arm 214 is provided with a means for supporting an object, such as a fishing hook, to which a length of flexible line is to be attached via a knot.

In a variation on the embodiment depicted in FIG. 8, the apparatus can further include line clippers (essentially similar to finger nail clippers) which can be useful for cutting the flexible line. Since excess line typically needs to be trimmed from a knot after a fishing hook is tied to the line, the line clippers can be a useful addition to the apparatus.

The apparatus depicted in FIGS. 3 through 8 and described above depict various examples of apparatus which can be constructed in accordance with the present invention. It is understood however that these are merely examples, and that other examples within the scope of the present invention can also be employed to equal effect.

Figure 9A:
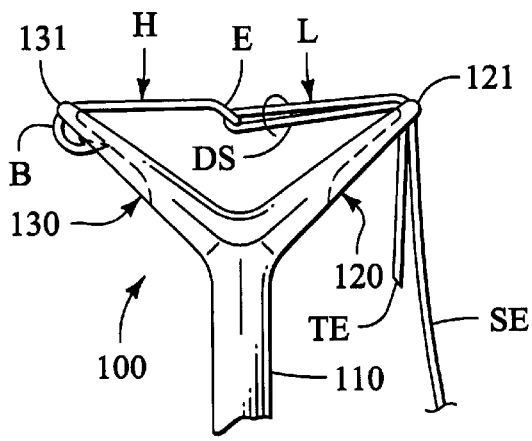
FIGS. 9a through 9d depict a variety of ways in which a fish hook attached to a flexible line can be supported in the second arm of the apparatus of FIG. 4.

I will now describe by example methods of using the apparatus of the present invention. Turning to FIGS. 9a through 14, a first method of tying a knot using the apparatus of the present invention is depicted. It will be appreciated that the knot tied as described with reference to these figures also represents a novel knot. This first method of using the apparatus will be described with respect to the apparatus depicted in FIGS. 3 and 4. Turning to FIG. 9a, in a first step an object, such as fishing hook "H", is supported in the second arm 130 of the apparatus 100. In this example, the hook H is supported in the notch (134 of FIG. 4) in the free end 131 of the second arm 130, and the point of the hook (not shown) is received in the recess (132 of FIG. 4). The hook H comprises an eye "E", which defines an opening through which a length of flexible line can be disposed. A flexible line "L" is provided, which is to be attached to the hook H via a knot at the opening in the eye E. The flexible line "L" is defined by a free end (also known as the "tag end") "TE" and a standing end "SE". The standing end SE can, for example, be attached to a supply source of the line, such as a reel or a spool.

Preferably, prior to supporting the hook H in the second arm, the tag end TE of the flexible line L is passed through the opening in the eye E of the hook H, and is then passed back in the direction of the tag end TE to form a double strand "DS" of the line L. The double strand DS is then supported in the notch (124 of FIG. 4) at the free end 121 of the first arm 120.

Figure 9B:
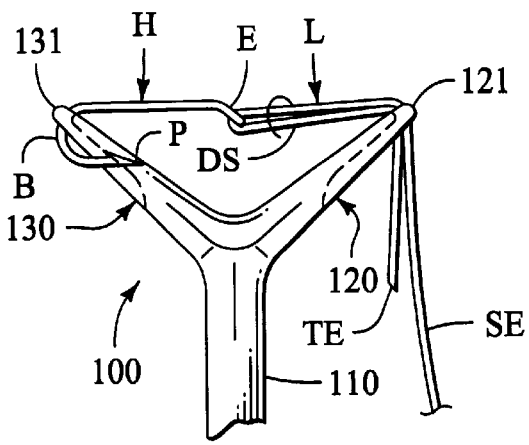
Figure 9C:
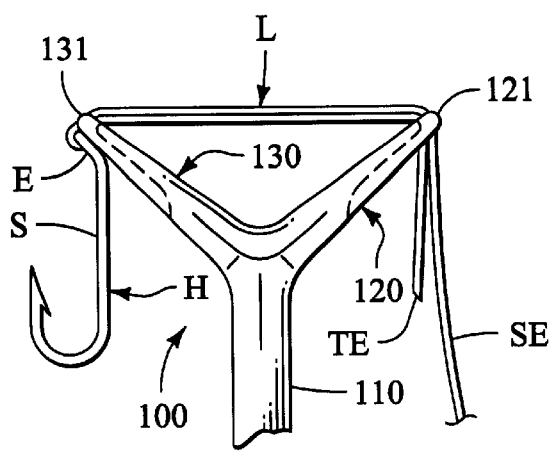
Figure 9D:
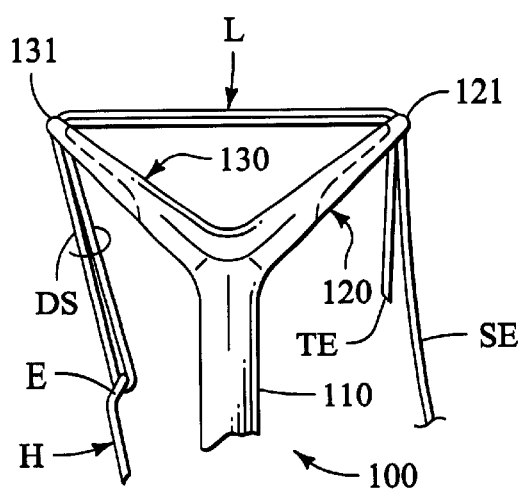

FIGS. 9b through 9d depict alternate methods for supporting the hook "H" in the second arm 130. When the hook is provided with a relatively large bend "B" such that the point "P" of the hook will not fit easily within the recess (132 of FIG. 4) in the second arm 130, the point "P" can be located outside of the recess, as depicted in FIG. 9b. When a relatively large hook is used such that the length of the shank "S" of the hook starts to approach the length of the distance between the free end 131 of the second arm and the free end 121 of the first arm, then the eye "E" of the hook can be supported in the notch (134 of FIG. 4) in the free end 131 of the second arm 130, as depicted in FIG. 9c. Yet another variation is to support one or both strands of the line "L" in the notch 134 in the second arm, as depicted in FIG. 9d. The choice of how to support the hook "H" in the second arm will typically be dictated by the size of the hook, and the preference of the user based on comfort and convenience. Users with large fingers may find one method of supporting the hook preferable to another. In any event, the method of supporting the hook "H" in the second arm 130 will not affect the ultimate quality of the final knot used to secure the hook "H" to the line "L".

Figure 10:
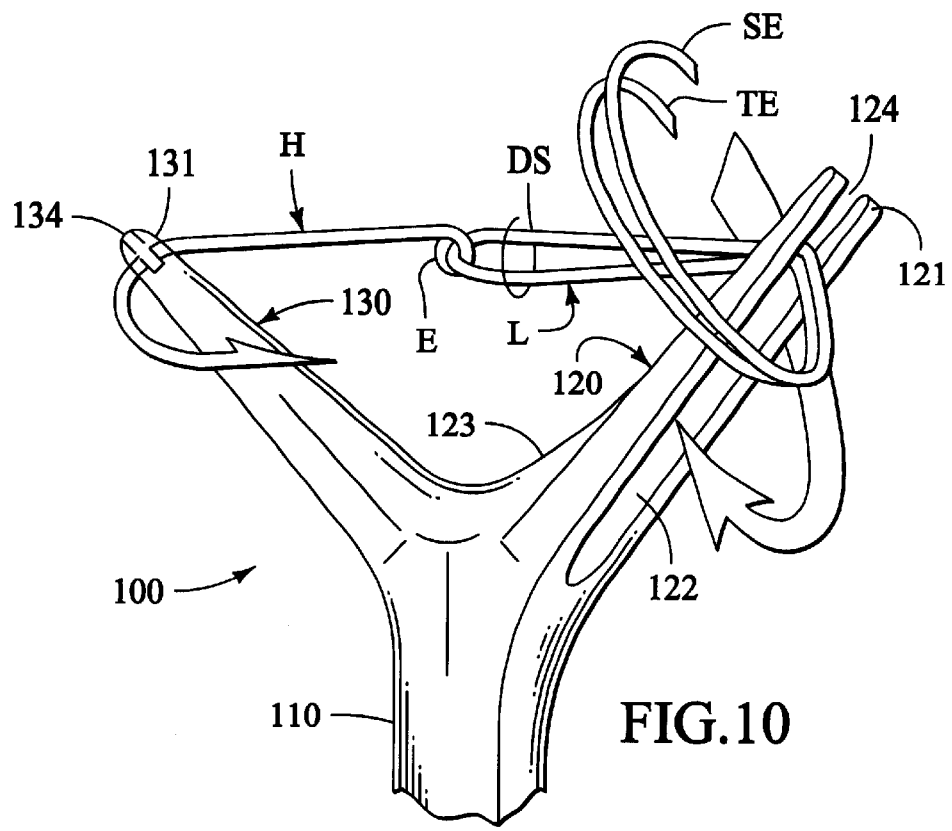
FIG. 10 depicts a fist step in a method in accordance with the present invention, using the apparatus of FIG. 4, to attach a fish hook to a flexible line.

The next step in the method is depicted in FIG. 10. Here, the double strand of line DS, comprising the tag end TE and the standing end SE of the line L, is grasped, and is wrapped about the first arm 120 in the direction indicated by the arrow. The double strand of line DS can also be wrapped abound the first arm 120 in the opposite direction. In performing this wrapping of the double strand of line, the portion of the line double strand which includes the tag end TE is wrapped abound the portion of the double strand DS which is disposed between the eye E of the hook H and the first arm 120. That is, the double strand of line DS is wrapped abound itself as it is wrapped onto the first arm. A plurality of such wraps of the double strand DS around the first arm 120 should be performed. Preferably, between two and six wraps of the double strand around the first arm 120 are performed. As each wrap of the double strand is made around the first arm, the wraps should advance down the first arm 120 in a direction away from the free end 121 and towards the junction end 123. Each wrap should go over the double strand of line DS which is disposed between the eye E of the hook H and the first arm 120.

Figure 11:
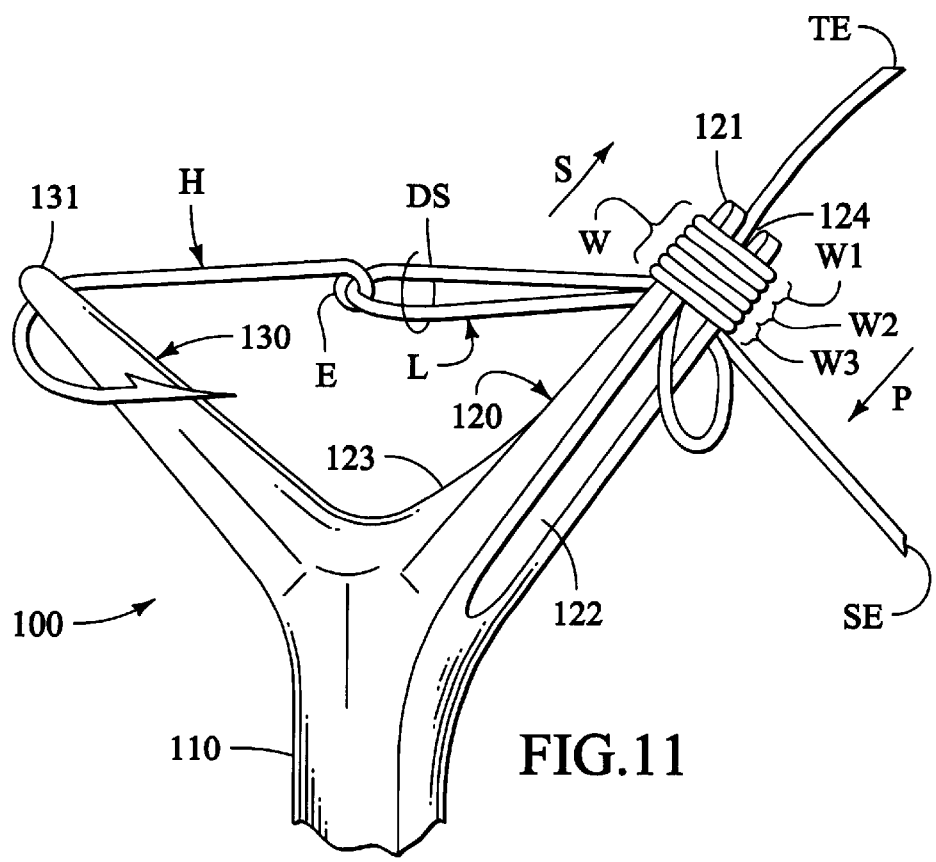
FIG. 11 depicts a second step in a method in accordance with the present invention, using the apparatus of FIG. 4, to attach a fish hook to a flexible line.

The result of wrapping the double strand of line DS around the first arm 120 is depicted in FIG. 11. As shown, three wraps, W1, W2 and W3, have been made around the first arm, and comprise the total wraps "W". The wrap W1 represents the first wrap made, and the wrap W3 indicates the last wrap made. More wraps can be made below wrap W3, but for the purpose of illustrating the method, only three wraps are shown. Each wrap of the double strand defines a loop, and each loop is defined by an opening which is formed between the upper and lower surface of the first arm and conforms to the groove 122. The openings formed by each loop provide a passageway under the wraps through which a length of the line L can now be passed. Consequently, in the next step the tag end TE of the line L is passed through this passageway in a direction from the junction end 123 of the first arm towards the free end 121 of the first arm. The tag end TE protrudes from the free end 121 of the first arm 120 after being passed through the passageway. The knot is now basically formed, and only remains to be tightened against the eye E of the hook H.

Figure 11A:
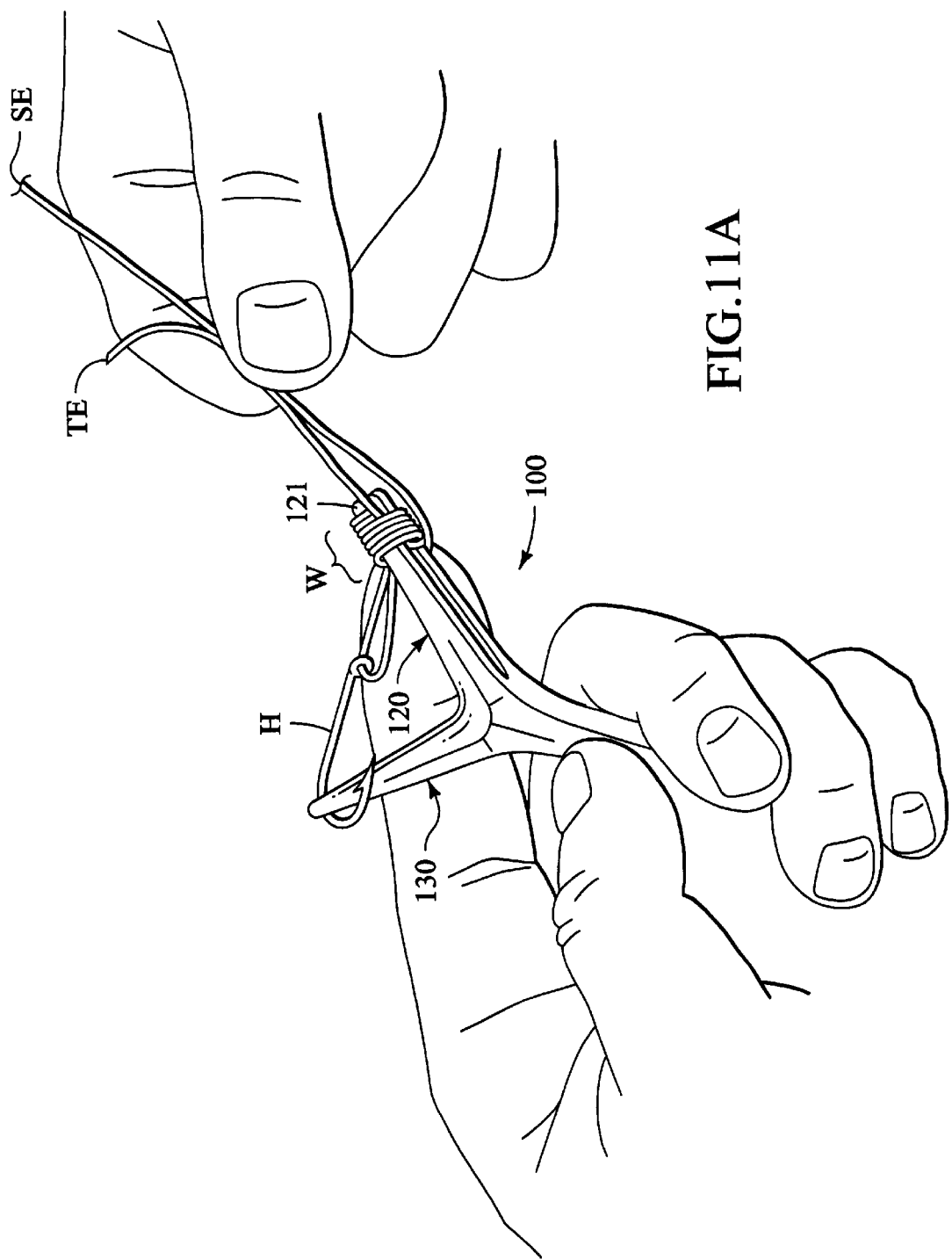
FIG. 11a depicts a third step in a method in accordance with the present invention, using the apparatus of FIG. 4, to attach a fish hook to a flexible line.
Figure 12:
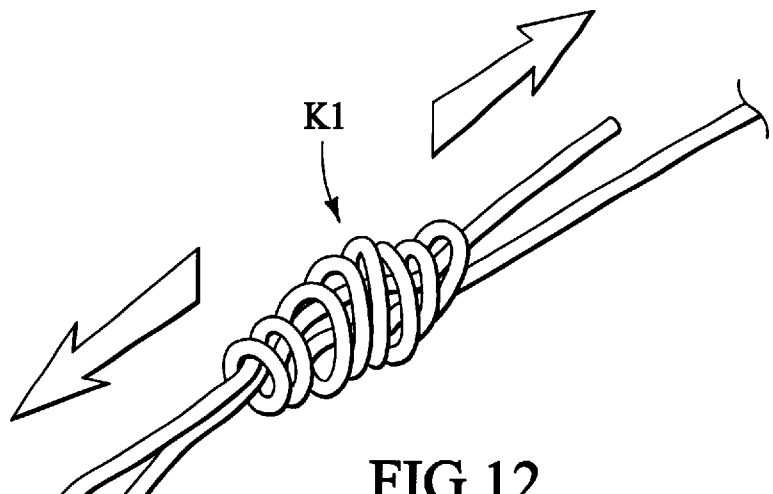
FIG. 12 depicts a fourth step in a method in accordance with the present invention, using the apparatus of FIG. 4, to attach a fish hook to a flexible line.
Figure 13:
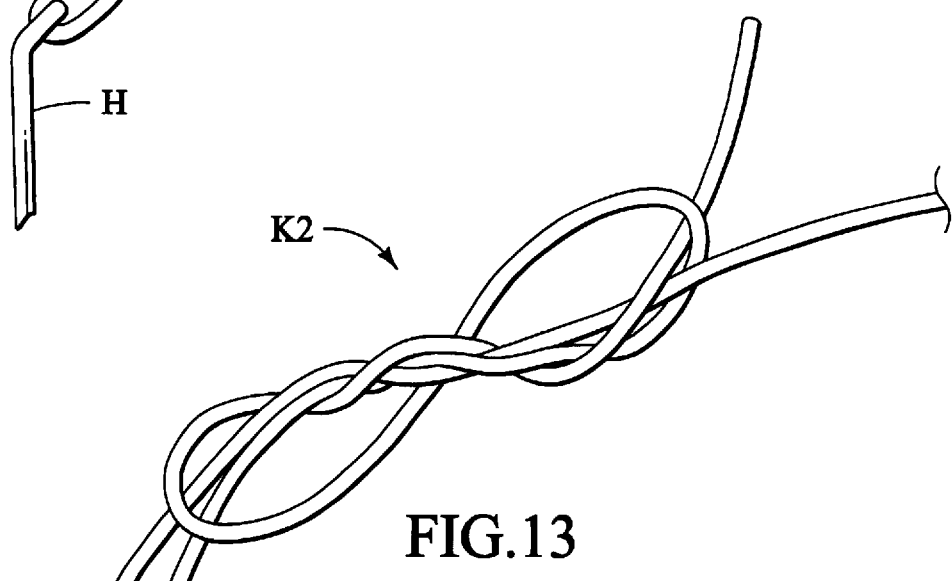
FIG. 13 depicts a fifth step in a method in accordance with the present invention, using the apparatus of FIG. 4, to attach a fish hook to a flexible line.
Figure 14:
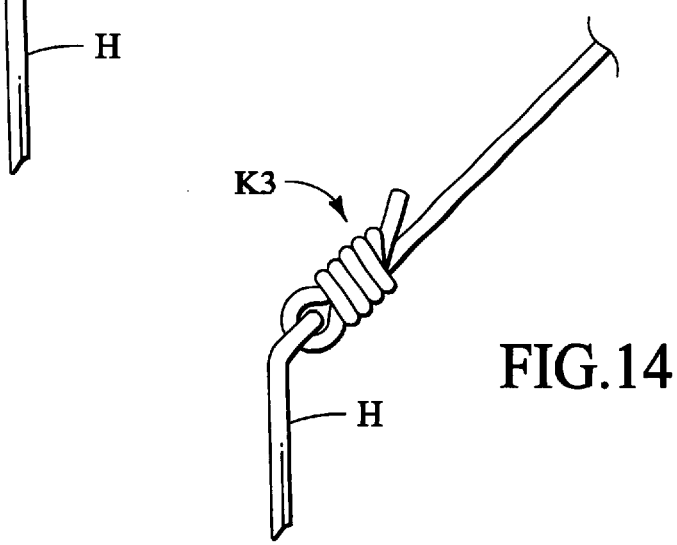
FIG. 14 depicts a knot completed using the method depicted in FIGS. 10 through 13 to attach a fish hook to a flexible line.

FIG. 11a depicts the same stage in the method as is depicted in FIG. 11, and shows how the knot is removed from the first arm 120. A user grasps the tag end TE and the standing end SE of the line L, and pulls in a direction away from the first arm free end 121 to allow the knot to slip off of the first arm free end, as depicted in FIG. 12. The freed knot K1 of FIG. 12 is preferably provided an opportunity to assume its natural shape, which is determined primarily by the resilience of the line being used. This process can be facilitated for example by lightly pulling the hook in one direction while pulling on the standing end SE of the line in the other direction. The resulting shape of the knot is depicted in FIG. 13 as knot K2. Then in the last step of the method, which is depicted in FIG. 14, the standing end SE of the line L is pulled tight while the hook is held fast, allowing the knot to cinch tight around the eye E of the hook H as knot K3. Any surplus length of the tag end TE of the line can then be trimmed to provide a clean appearance to the knot.

Figure 15:
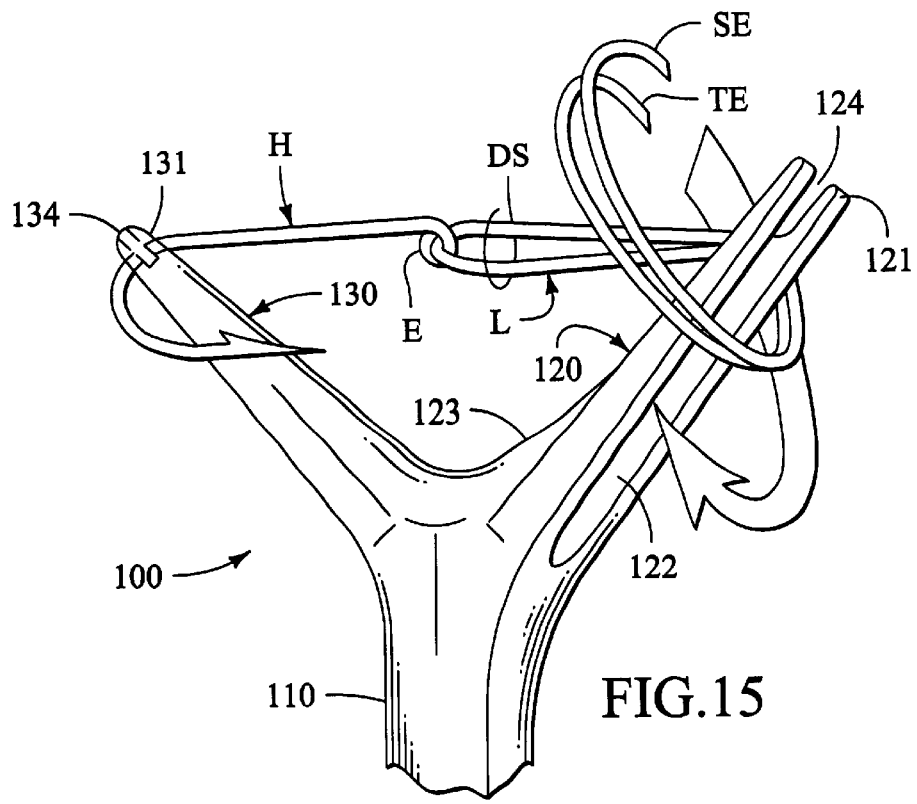
FIG. 15 depicts a fist step in a method in accordance with the present invention, using the apparatus of FIG. 4, to splice a first line to a second line.

Yet a second method of securing an object to a flexible line using the apparatus of the present invention is depicted in FIG. 15. FIG. 15 should be compared to FIG. 10. In FIG.

10 the double strand DS of line L is first passed into the notch 124, and is then wrapped around the first arm 120. In FIG. 15 the double strand of line DS is not passed through the notch 124, but is wrapped directly around the first arm 120 and over the portion of double strand DS disposed between the hook H and the first arm 120. The wrapping of the double strand and formation of the line then proceeds as shown in FIGS. 11 through 14.

Figure 16:
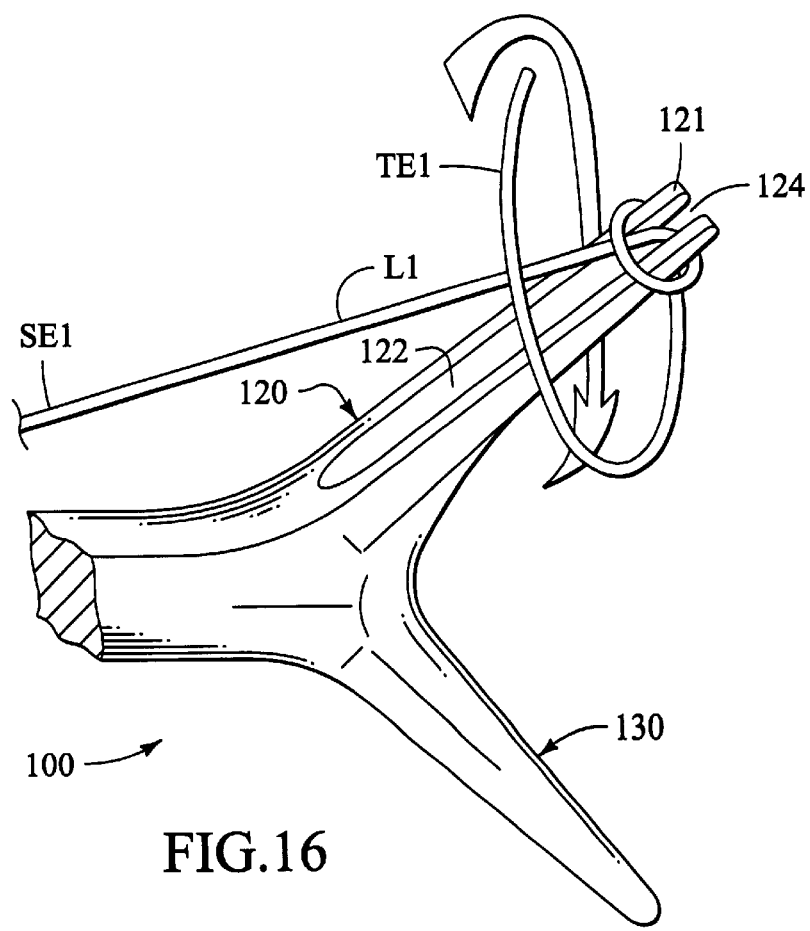
FIG. 16 depicts a second step in a method in accordance with the present invention, using the apparatus of FIG. 4, to splice a first line to a second line.
Figure 18:
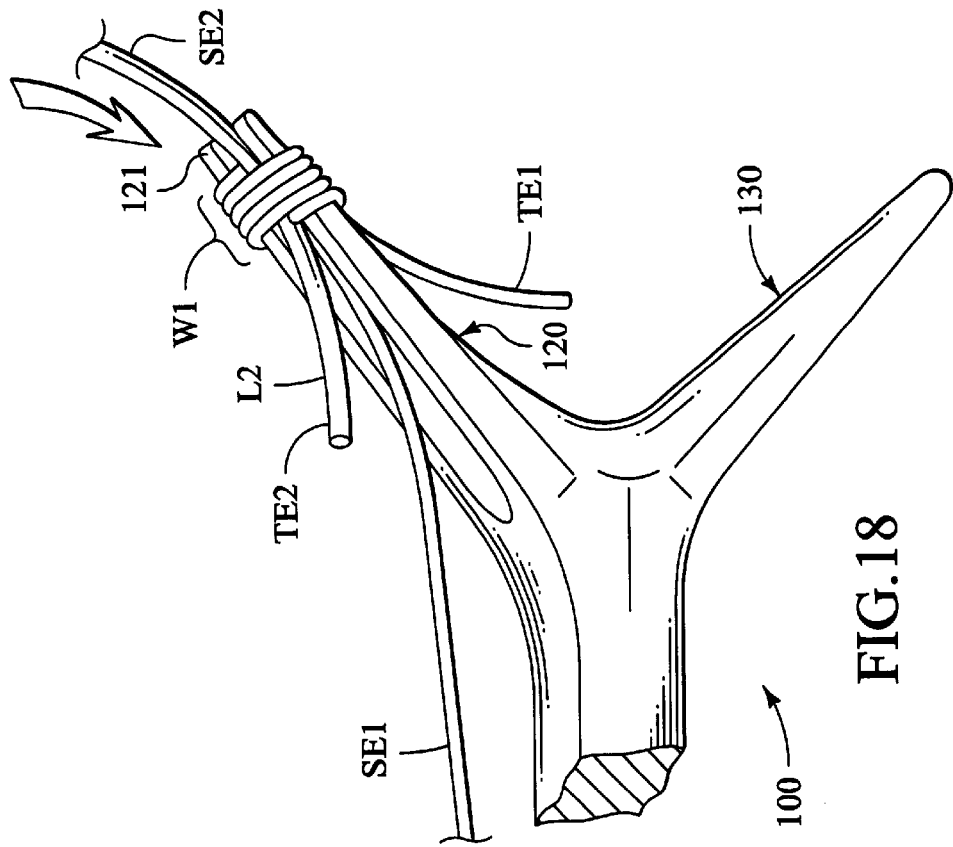
FIG. 18 depicts a fourth step in a method in accordance with the present invention, using the apparatus of FIG. 4, to splice a first line to a second line.
Figure 17:
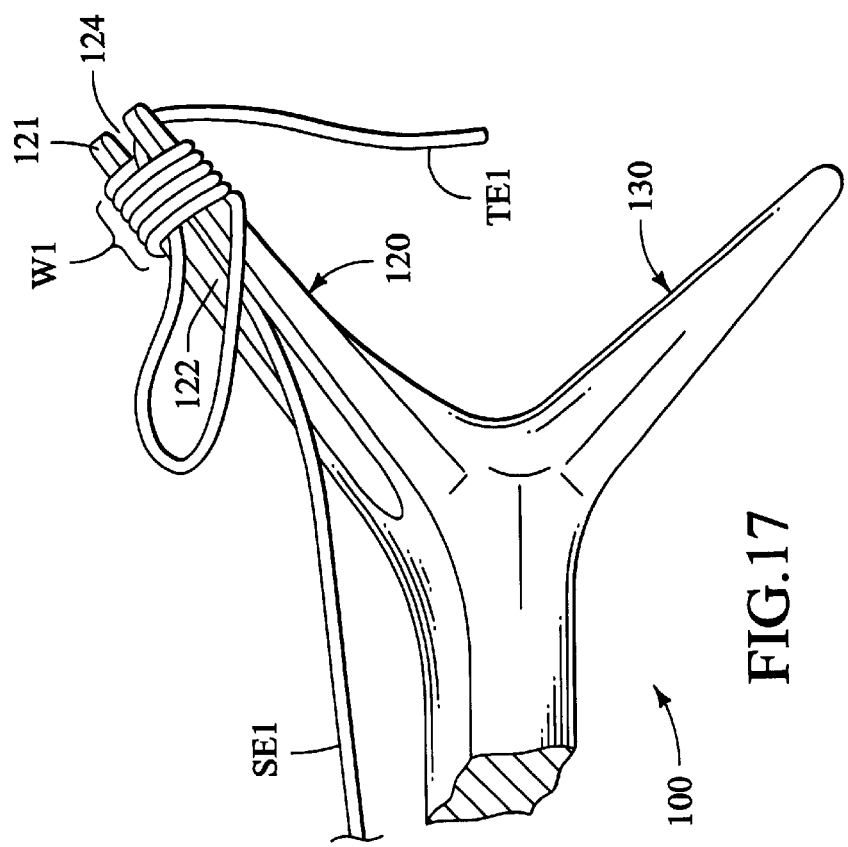
FIG. 17 depicts a third step in a method in accordance with the present invention, using the apparatus of FIG. 4, to splice a first line to a second line.
Figure 19:
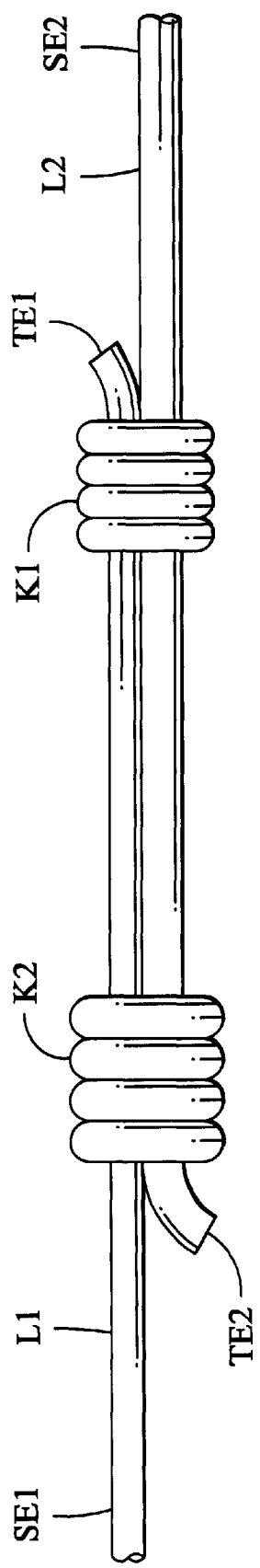
FIG. 19 depicts a splice completed using the method depicted in FIGS. 15 through 18 to splice a first line to a second line.

A method of using the apparatus of the present invention to splice a first line to a second line will now be described. Again the method will be described with reference to the apparatus 100 of FIGS. 3 and 4. In the method, a first line L1, which is defined by a tag end TE1 and a standing end SE1, is spliced to a second line L2, which is defined by a tag end TE2 and a standing end SE2. FIG. 16 depicts a first step in the method, which comprises passing the tag end TE1 of the first line L1 into the notch 124 of the first arm 120 of the apparatus 100. The tag end TE1 is then wrapped around the first arm in a manner similar to the wrapping of the double strand as depicted in FIGS. 10 and 11. That is, a plurality of wraps are formed around the first arm to secure the standing end SE1 of the line L1 to the first arm. The wraps progress from proximate the free end 121 towards the junction end 123 (FIG. 3) of the first arm 120. The result is depicted in FIG. 17. The tag end TE1 of the line is then passed through the passageway formed by the wraps W1 and the recessed area 122 in the first arm 120, in a manner similar to that shown in FIG. 11. However, at this point, rather than pull the wraps W1 off of the first arm, the tag end TE2 of the second line L2 is passed through the passageway from the first end 121 towards the junction end 123 (FIG. 3) of the first arm 120, as depicted in FIG. 18. The second line tag end TE2 is then pulled towards the first line standing end SE1 to form a double strand of line. The wraps W1 are then removed from the first arm 120 in a manner similar to that depicted in FIGS. 11 a and 12. The double strand of line L1 and L2 is then wrapped around the first arm 120 in a manner similar to that shown in FIGS. 10 and 11, and pulled off of the first arm 120 in the manner depicted in FIGS. 11a and 12. The splice knot is then basically formed, except that the knot is allowed to "relax" in the manner described above with respect to FIG. 13. One the knot has taken on its natural shape, the two standing ends SE1 and SE2 are pulled together, resulting in a knot as depicted in FIG. 10. As can be seen, line L1 forms a knot K1 about line L2, and line L2 forms a second knot K2 about the first line L1. By continuing to pull the standing ends SE1 and SE2, the knots K1 and K2 are drawn together, and the splice is completed.

In a variation on the splicing method just described, rather than remove the first knot formed by line L1 from the first arm 120 and then forming the second knot on the first arm, the first knot can be kept on the first arm while the second knot is formed from lines L1 and L2 on the second arm. The two knots are then removed from the respective arms and tightened in the manner just described.

In another variation on the splicing method, rather than form the first knot using only the first line L1, the first knot is formed using both lines L1 and L2 in the manner shown in FIG. 10 for tying a knot to secure an object to a line. In this variation the two lines L1 and L2 are positioned side-by-side to form the double strand DS of line of FIG. 10. The tag end TE1 of the first line L1 is located proximate to the standing end SE2 of the second line, while the tag end TE2 of the second line L2 is located proximate to the standing end SE1 of the first line. A first knot is formed on the first arm 120 near the tag end TE1 of the first line L1 in the manner depicted in FIGS. 10 and 11, and is then removed from the first arm. A second knot is then formed on the first arm 120 near the tag end TE2 of the second line L2 in a similar manner, and is then removed from the first arm. After the knots have been allowed to "relax", the two standing ends SE1 and SE2 are pulled in opposite directions, allowing the knots to cinch tightly about the lines and form the splice.

The invention also includes the splice knot tied using the alternate variation just described. The splice can be made using the apparatus of the present invention, as well as by using other apparatus. In general, the method of making the splice comprises providing a first line defined by a first line tag end and a first line standing end, and a second line defined by a second line tag end and a second line standing end. A section of the first line is laid adjacent to a section of the second line such that the tag end of the first line is proximate the standing end of the second line. The tag end of the first line is held against the standing end of the second line to form a first double strand of line. The first double strand of line is then wrapped around itself to form a first plurality of wraps around the first double strand of line. This first plurality of wraps defines a plurality of first loops through which the first double strand of line passes. Further, the first wraps progress along the double strand of line in the general direction of the tag end of the second line. Next, the tag end of the first line is passed through the first loops in a direction towards the standing end of the second line. This essentially completes the first of the two knots which will eventually comprise the splice.

The second knot, which will complete the splice, is formed in a similar manner as the first knot. Specifically, the tag end of the second line is held against the standing end of the first line to form a second double strand of line. Then the second double strand of line is wrapped around itself to form a second plurality of wraps around the second double strand of line. The second wraps define a plurality of second loops through which the second double strand of line passes. Further, the wraps progress along the second double strand of line in the direction of the tag end of the first line. The tag end of the second line is then pulled through the second loops in a direction towards the standing end of the first line.

Finally, the splice is completed by pulling the standing end of each line to secure the lines together.

Another aspect of the present invention includes the end-knot which is tied as described above with reference to FIGS. 9a through 14. The knot can tied using the apparatus of the present invention, as well as by using other apparatus. In general, the method of tying the knot comprises providing a flexible line to secure an object to the flexible line. The flexible line is defined by a tag end and a standing end, and the object defines an opening to receive the flexible line. The tag end of the line is passed through the opening in the object and is directed back to the standing end of the line. The tag end of the line is then held against the standing end of the line to form a double strand of line, which is wrapped around itself to form a plurality of wraps around the double strand of line. Each wrap defines a loop through which the double strand of line passes. Further, the wraps progress along the double strand of line in the general direction of the opening in the object. Once the wraps have been formed, the tag end of the line is passed through the loops in a general direction away from the opening in the object. Finally, the standing end of the line is pulled tight to secure the line to the object.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An apparatus for assisting in tying knots, comprising:
   a holding member configured to allow a user to hold the apparatus;
   a first arm defined by a longitudinal axis, the first arm having a free end and a junction end, the junction end being attached to the holding member;
   a second arm having a free end and a junction end, the junction end being attached to the holding member; and
   wherein:
      the first arm free end and the second arm free end are positioned in spaced apart relationship;
      the first arm defines a groove parallel to the longitudinal axis, the groove opening out of the free end of the first arm and sized to allow a flexible line to be received length-wise within the groove; and
      the second arm free end defines a second arm notch configured to support a fishing hook.

2. The apparatus of claim 1, and further wherein the holding member comprises a hinge connection connecting the first arm junction end and the second arm junction end, and further wherein at least one of the arms is hingedly attached to the hinge connection to thereby allow the free ends of the two arms to be moved in relative proximity to one another.

3. The apparatus of claim 1, and further wherein the holding member comprises a longitudinal bar having a first end and a second end, and wherein the first arm junction end is attached to the longitudinal bar at the first end, and the second arm junction end is attached to the longitudinal bar at the second end.

4. The apparatus of claim 1, and further wherein the first arm free end further defines a first arm notch.

5. The apparatus of claim 4, and further wherein the second arm is defined by a longitudinal axis, and the second arm defines a second groove parallel to the second arm longitudinal axis, the second groove opening out of the free end of the second arm.

6. The apparatus of claim 1, and further wherein the first arm is defined by a cross section, and furtherwherein the first arm is tapered proximate to the free end such that the cross section of the first arm is smaller at the first arm free than at a point distal from the first arm free end.

7. The apparatus of claim 1, and further wherein the junction end of the first arm and the junction end of the second arm are attached to the holding member proximate to one another, and the arms are arranged in splayed-apart relationship to one another.

8. The apparatus of claim 7, and further wherein the first arm, the second arm, and the holding member are arranged in a "Y" shape.

9. The apparatus of claim 1, and further wherein the first arm and the second arm are attached to the holding member at an angle to one another of between about ten degrees and about one hundred and eighty degrees.

10. The apparatus of claim 1, and further wherein the first arm and the second arm are attached to the holding member at an angle to one another of between about thirty degrees and about one hundred and twenty degrees.

11. The apparatus of claim 1, and further wherein the first arm is approximately of equal length as the second arm.

12. The apparatus of claim 1, and wherein the holding member further comprises a bottle opener formed on the holding member.

13. The apparatus of claim 1, and wherein the holding member further comprises a line cutting device supported by the holding member.

14. The apparatus of claim 1, and wherein at least one of the first or second arms is formed from a section of hollow tubing.

15. The apparatus of claim 1, and wherein the apparatus is configured in the shape of a fish, wherein the first arm and the second arm act as respective upper and lower tail fins of the fish, and the holding member acts as a body of the fish.

16. An apparatus for assisting in tying knots, comprising:
    a first arm having a free end and a junction end;
    a second arm having a free end and a junction end, the second arm junction end being attached to the first arm junction end; and
    wherein:
       the first arm free end and the second arm free end are positioned in spaced apart relationship;
       the first arm defines an indented section configured to receive a flexible line, and sized to allow the flexible line to be received length-wise within the indented section, and to allow the flexible line to pass from the free end of the first arm; and
       the second arm free end defines hook support configured to support a fishing hook.

17. The apparatus of claim 16, and further comprising a holding member attached to the first arm junction end and the second arm junction end.

18. The apparatus of claim 16, and further wherein the first arm free end defines a notch.

19. A method of tying a knot from a flexible line to secure an object to the flexible line, the flexible line defining a tag end and a standing end, the object defining an opening to receive the flexible line, the method comprising:
    passing the tag end of the line through the opening and directing the tag end of the line back to the standing end of the line;
    holding the tag end of the line against the standing end of the line to form a double strand of line, and wrapping the double strand of line around itself to form a plurality of wraps around the double strand of line, each wrap defining a loop through which the double strand of line passes, the wraps progressing along the line in the direction of the opening in the object;
    passing the tag end of the line through the loops in a direction away from the opening in the object; and
    pulling the standing end of the line to secure the line to the object.

20. The method of claim 19, and further comprising, following the step of holding the tag end of the line against the standing end of the line to form a double strand of line and prior to the step of wrapping the double strand of line around itself, the step of securing the double strand of line to an anchor point to facilitate the step of wrapping the double strand of line around itself.

21. The method of claim 19, and wherein the double strand of line is wrapped around itself at least three times.

22. The method of claim 19, and further comprising providing an elongated member, and wherein in the step of wrapping the double strand of line around itself, the double strand of line is pressed against the elongated member, and the double strand of line is wrapped around the member.

23. The method claim 22, and further comprising, prior to the step of pulling the standing end of the line to secure the line to the object, the step of pulling the wraps of line off of the elongated member.

24. The method of claim 23, and further comprising, following the step of pulling the wraps of line off of the elongated member, the step of pulling the double strand of line between the object and the wraps of line, while also pulling on the standing end of the line.

25. A knot formed using the method of claim 19.

26. A method of splicing a first line to a second line, the first line being defined by a first line tag end and a first line standing end, the second line being defined by a second line tag end and a second line standing end, comprising:

laying a section of the first line adjacent to a section of the second line such that the tag end of the first line is proximate the standing end of the second line;

holding the tag end of the first line against the standing end of the second line to form a first double strand of line, and wrapping the first double strand of line around itself to form a first plurality of wraps around the first double strand of line, the wraps defining a plurality of first loops through which the first double strand of line passes, the first wraps progressing along the line in the direction of the tag end of the second line;

passing the tag end of the first line through the first loops in a direction towards the standing end of the second line;

holding the tag end of the second line against the standing end of the first line to form a second double strand of line, and wrapping the second double strand of line around itself to form a second plurality of wraps around the second double strand of line, the second wraps defining a plurality of second loops through which the second double strand of line passes, the wraps progressing along the line in the direction of the tag end of the first line;

passing the tag end of the second line through the second loops in a direction towards the standing end of the first line; and pulling the standing end of each line to secure the lines together.

27. The method of claim 26, and further comprising, following the step of holding the tag end of the first line against the standing end of the second line to form a first double strand of line and prior to the step of wrapping the first double strand of line around itself, the step of securing the first double strand of line to an anchor point to facilitate the step of wrapping the first double strand of line around itself.

28. The method of claim 27, and further comprising, following the step of holding the tag end of the second line against the standing end of the first line to form a second double strand of line and prior to the step of wrapping the second double strand of line around itself, the step of securing the second double strand of line to an anchor point to facilitate the step of wrapping the second double strand of line around itself.

29. The method of claim 26, and wherein the first double strand of line is wrapped around itself at least three times.

30. The method of claim 29, and further wherein the second double strand of line is wrapped around itself at least three times.

31. The method of claim 26, and further comprising providing an elongated member, and wherein in the step of wrapping the first double strand of line around itself, the first double strand of line is pressed against the elongated member, and the first double strand of line is wrapped around the member.

32. A splice formed using the method of claim 26.

* * * * *